A. A. WEIGEL.
ANTIFRICTION BEARING.
APPLICATION FILED APR. 2, 1914.
1,168,358.
Patented Jan. 18, 1916.
2 SHEETS—SHEET 1.
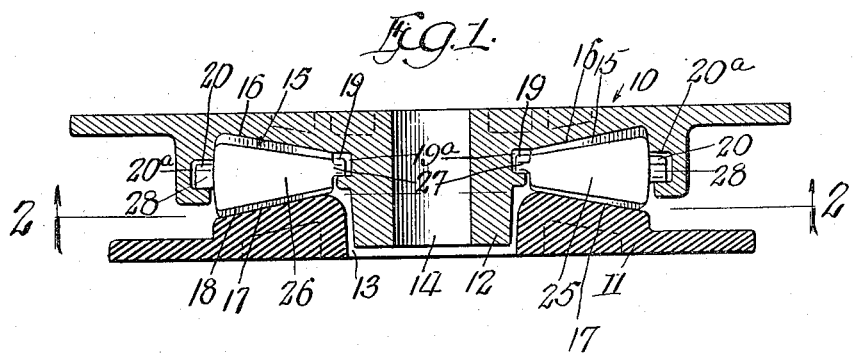
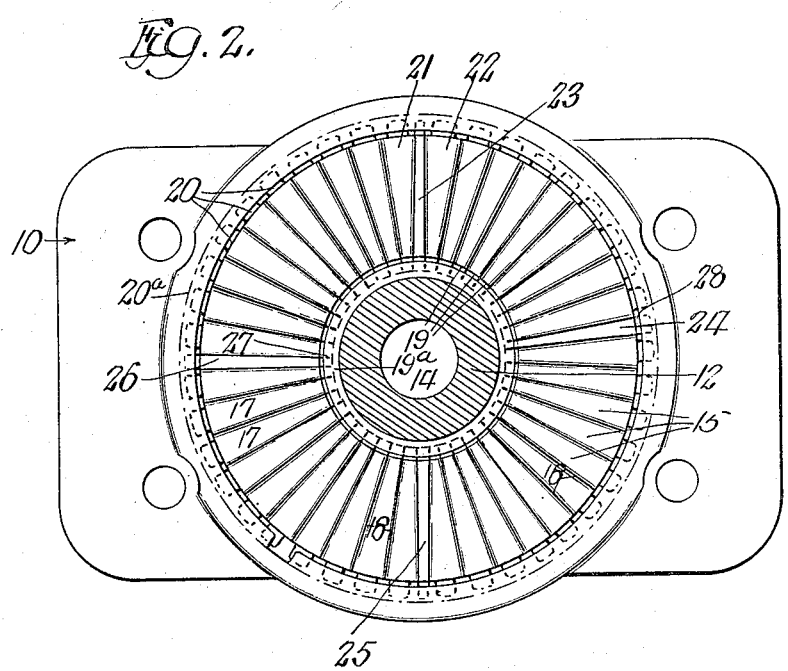
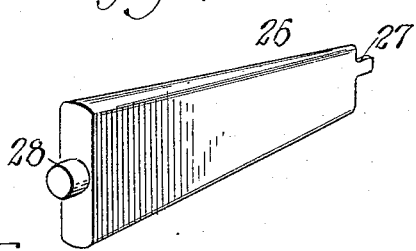
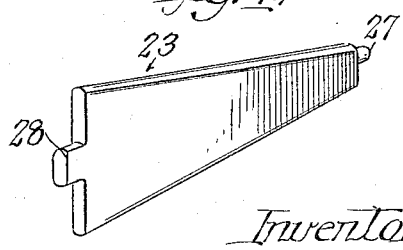
Witnesses:
Inventor
Arnold A. Weigel
by Brown & Phillips
Attys

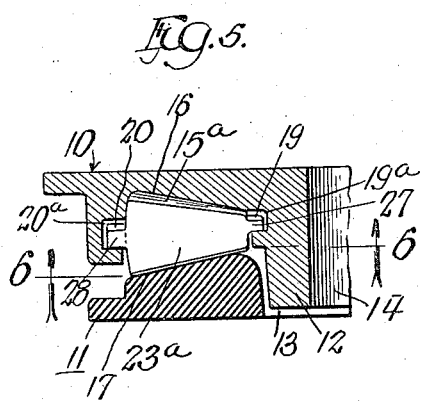
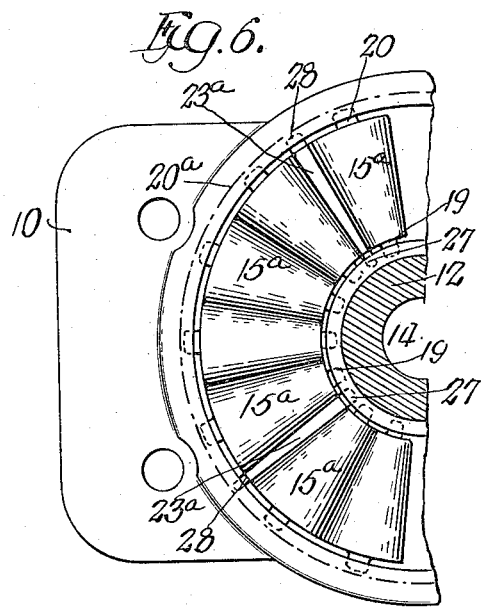
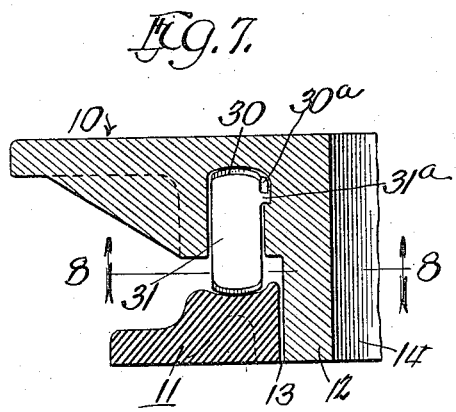
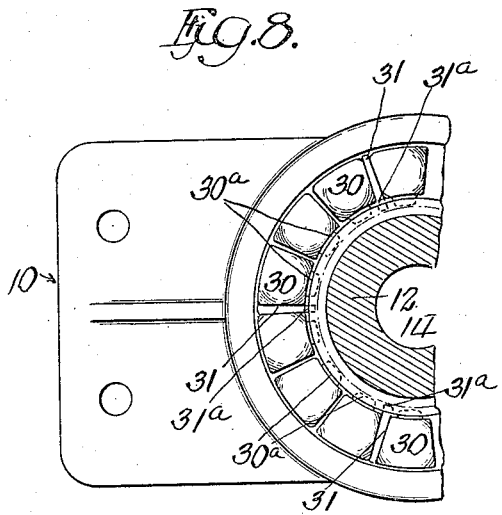

UNITED STATES PATENT OFFICE.

ARNOLD A. WEIGEL, OF CHICAGO, ILLINOIS, ASSIGNOR TO ALBERT G. WELCH, OF CHICAGO, ILLINOIS, TRUSTEE OF EDWIN S. WOODS, DECEASED.

ANTIFRICTION-BEARING.

1,168,358.   Specification of Letters Patent.   Patented Jan. 18, 1916.

Application filed April 2, 1914. Serial No. 828,953.

*To all whom it may concern:*

Be it known that I, ARNOLD A. WEIGEL, a citizen of the United States, and a resident of Chicago, in the county of Cook and State of Illinois, have invented certain new and useful Improvements in Antifriction-Bearings; and I do hereby declare that the following is a full, clear, and exact description thereof, reference being had to the accompanying drawings and to the letters of reference marked thereon, which form a part of this specification.

This invention relates to improvements in antifriction bearings and particularly to antifriction bearings adapted for use as center bearings interposed between the truck and body bolsters of a railway car and in analogous situations. The center bearing illustrated is of the general type described in the patent heretofore granted on the 20th day of June 1911 to Edwin S. Woods, No. 995,835, entitled "Antifriction center bearing," in which there are interposed between two relatively oscillatory bearing members a plurality of annularly arranged, radially disposed, antifriction elements having conical, inwardly tapering bearing surfaces for rolling engagement with said bearing members.

The antifriction elements as preferably made for this type of bearing, are drop forgings. It has been found that in manufacturing such antifriction elements it is impossible to drop forge them in such way that they will all be identically alike. Some of them will be a little too wide at the outer ends and too narrow at their inner ends, while in others the proportions will be reversed. As a result when the antifriction elements are assembled, it is impossible for them all to assume a true radial position with reference to the center of the bearing and as such radial disposition is essential for the efficient operation of the bearing, it is manifest that time and expense is required to be expended in order to select only antifriction elements that when assembled will assume the desired relation. In order to obviate this difficulty I have provided the construction embodying the present invention which consists of the matters hereinafter described and more particularly pointed out in the appended claims.

In the drawings: Figure 1 is a view representing a vertical central section through a bearing of the type described provided with my improvements. Fig. 2 is a view representing a transverse section through Fig. 1 in a plane indicated by the line 2—2 of Fig. 1 and as looked at from below in the direction of the arrows. Figs. 3 and 4 are perspective views of spacing blocks used in connection with my invention. Fig. 5 is a partial vertical sectional view of a slightly different form of center bearing provided with my improvement. Fig. 6 is a view representing a transverse section of the bearing in a plane indicated by the line 6—6 of Fig. 5 and as looked at from below in the direction of the arrows. Fig. 7 is a view representing still another type of center bearing provided with my improvement. Fig. 8 is a view representing a transverse section through Fig. 7 in a plane indicated by the line 8—8 of Fig. 7 and as looked at from below in the direction of the arrows.

Referring now to that embodiment of my invention illustrated in the drawings and particularly in Figs. 1 to 4 inclusive thereof: 10 indicates an upper bearing member and 11 a lower bearing member adapted to form a center bearing of the kind described. The upper bearing member has a hub 12 which engages in a hole or opening 13 in the lower bearing member and which is itself provided with a central hole 14 for the familiar king bolt.

15 indicates the antifriction elements interposed between the two bearing members and adapted to transmit load from the upper bearing member to the lower bearing member. The antifriction elements 15 as shown in Figs 1 and 2 have top and bottom conical, inwardly tapering bearing surfaces 16, 17, which are adapted for rolling engagement with the respective bearing members. Said antifriction elements also have flat sides 18, 18 which are designed to be disposed in planes radial to the center of the bearing when the antifriction elements are assembled in the chamber provided between the two bearing members in a familiar manner. Said antifriction elements also have trunnions 19, 20 at their inner and outer ends, respectively, adapted for engagement in annular recesses 19$^a$, 20$^a$ provided in the upper bearing member at the sides of the annular chamber containing said antifriction elements to support said antifriction elements in the upper bearing member when the lower bearing member is withdrawn.

When the antifriction elements are drop forged which is the preferable manner in which to make them, both for purposes of economy and for strength, it will be found as already stated that the antifriction elements as they are assembled will tend to depart more and more from the desired radial position owing to the inequalities in their dimensions occurring in drop forging them. Thus looking at Fig. 2 it will be noted that the antifriction element indicated at 21 and the one indicated at 22 are such that if they were brought together the antifriction element 22 would not even approximate a radial position.

23 indicates a spacing-block which is placed between the two antifriction elements 21, 22, which is wider at its inner end than at its outer end and which is radially disposed between the two antifriction elements in such manner as to bring them into approximately a radial position.

Several of the spacing-blocks referred to may be required in each antifriction bearing and as shown in Fig. 2 there are four, that is to say, the one already referred to, 23, and those indicated respectively at 24, 25 and 26. These spacing-blocks (shown in perspective in Figs. 3 and 4,) consist of long thin blocks of substantially the length of the antifriction element, said blocks being provided at their ends with trunnions 27, 28 which are adapted for engagement in the annular grooves 19ª. 20ª of the bearing in the same manner as the like trunnions on the antifriction elements themselves. These blocks are preferably made in two sizes, one, as shown in Fig. 3, with the inner end considerably thinner than the outer end, and the other, as shown in Fig. 4, with the inner end somewhat thicker than the outer end. I find that by having a number of blocks of the two kinds when assembling the bearing, either type of block may be used as required so that when the antifriction elements are all assembled, all of them may be made to assume an approximately radial position with reference to the center of the bearing. The blocks are made of a height less than that of the antifriction elements so that they will not contact at their upper and lower edges with either of the bearing members and thus will have no effect to modify or change the normal operation of the antifriction elements.

In Figs. 5 and 6 I have shown my improvement applied to a bearing in which the antifriction elements are in the form of full cones. In these views 15ª indicates the antifriction elements and 23ª the spacing-block.

In Figs. 7 and 8 I have shown the improvement applied to an antifriction bearing wherein the antifriction elements are segments of spheres, each element consisting of a post having spherical bearing ends at the top and bottom and flat radial sides. In this case, 30 indicates the antifriction element and 31 the spacing-block. In the particular type of bearing shown in Figs. 7 and 8 the antifriction elements are provided with a single trunnion 30ª and the spacing-blocks are likewise provided with a single trunnion 31ª. In all cases the spacing-blocks are designed to and do compensate for the irregularities in the proportions of the antifriction elements and act to maintain said elements in approximately radial positions so that they are capable of operating in the desired manner.

I claim as my invention:

1. In a center bearing, in combination with upper and lower bearing members and a plurality of annularly arranged, radially disposed antifriction elements adapted to transmit load between said bearing members, a plurality of spacing blocks disposed at angular intervals among said antifriction elements, said spacing blocks approximating the vertical section of said antifriction elements but being of less vertical dimensions, and being of less thickness in an arcuate direction at one end than at the other and being provided with means for suspending them in proper relation between said antifriction elements.

2. In a center bearing, in combination with upper and lower bearing members and a plurality of annularly arranged, radially disposed antifriction elements adapted to transmit load between said bearing members, a plurality of spacing blocks disposed at angular intervals among said antifriction elements, said spacing blocks being of less vertical height than said antifriction elements and having substantially flat faces adapted to engage the radial faces of said antifriction elements, the faces of said spacing blocks being spaced apart at different angular distances at their inner and outer ends, and means for suspending said spacing blocks in non-bearing relation between said antifriction elements.

3. In a center bearing, in combination with upper and lower bearing members and a plurality of annularly arranged, radially disposed antifriction elements adapted to transmit load between said bearing members, a plurality of spacing blocks disposed at angular intervals among said antifriction elements, said spacing blocks being of less vertical height than said antifriction elements and having substantially flat faces adapted to engage the radial faces of said antifriction elements, the faces of said spacing blocks being spaced apart at different angular distances at their inner and outer ends, and means for suspending said spacing blocks in said upper bearing member in non-bearing relation between said antifriction elements.

4. In a center bearing, in combination with upper and lower bearing members and a plurality of annularly arranged, radially disposed antifriction elements adapted to transmit load between said bearing members, a plurality of spacing blocks at angular intervals among said antifriction elements, said spacing blocks being of less vertical height than said antifriction elements and having substantially flat faces adapted to engage the radial faces of said antifriction elements, the faces of said spacing blocks being spaced apart at different angular distances at their inner and outer ends, and means for suspending said spacing blocks in said upper bearing member in non-bearing relation between said antifriction elements, said means comprising inwardly and outwardly facing annular shoulders formed in said upper bearing member and trunnions formed on the inner and outer ends of said spacing blocks, said trunnions being adapted for supporting engagement with the respective inwardly and outwardly facing annular shoulders formed in said upper bearing member.

In testimony, that I claim the foregoing as my invention I affix my signature in the presence of two witnesses, this 24th day of March A. D. 1914.

ARNOLD A. WEIGEL.

Witnesses:
GEORGE R. WILKINS,
T. H. ALFREDS.

Copies of this patent may be obtained for five cents each, by addressing the "Commissioner of Patents, Washington, D. C."